United States Patent
Bourgeois et al.

(10) Patent No.: US 7,325,482 B1
(45) Date of Patent: *Feb. 5, 2008

(54) OUTDOOR COOKING APPARATUS

(76) Inventors: Norman Bourgeois, 712 St. George Ave., Jefferson, LA (US) 70121; Michael P. Bourgeois, 2125 Kentucky Ave., Kenner, LA (US) 70062

( * ) Notice: Subject to any disclaimer, the term of this patent is extended or adjusted under 35 U.S.C. 154(b) by 140 days.

This patent is subject to a terminal disclaimer.

(21) Appl. No.: 10/862,601

(22) Filed: Jun. 7, 2004

Related U.S. Application Data

(60) Provisional application No. 60/479,198, filed on Jun. 17, 2003.

(51) Int. Cl.
*A47J 37/00* (2006.01)

(52) U.S. Cl. .......................................... 99/340; 99/482

(58) Field of Classification Search ................ 99/339, 99/340, 403–418, 426, 345–347, 481, 482; 126/25 R, 9 R, 30, 40; 426/523
See application file for complete search history.

(56) References Cited

U.S. PATENT DOCUMENTS

| | | | |
|---|---|---|---|
| 57,577 A | 8/1866 | Saroni | |
| 74,123 A | 2/1868 | Patterson | |
| 123,876 A | 2/1872 | Durham | |
| 159,755 A | 2/1875 | Goodwyn | |
| 1,054,114 A | 2/1913 | Harper | |
| 1,272,222 A | 7/1918 | Clayton | |
| 1,390,908 A | 9/1921 | Jobe | |
| 1,569,544 A * | 1/1926 | Jamison .................. | 99/413 |
| 1,827,131 A | 10/1931 | Austin | |
| 2,021,465 A * | 11/1935 | Ritscher .................. | 99/403 |
| 2,350,335 A | 6/1944 | Bourgeois | |
| 3,053,169 A | 9/1962 | Rappaport | |
| 3,583,307 A * | 6/1971 | Lee, Sr. .................. | 99/333 |
| 3,838,680 A | 10/1974 | Shipman | |
| 4,420,493 A * | 12/1983 | Greck .................. | 426/420 |
| 4,450,759 A * | 5/1984 | Steibel .................. | 99/419 |
| 4,626,352 A * | 12/1986 | Massey et al. .......... | 210/469 |
| 4,735,135 A | 4/1988 | Walker | |
| 5,065,735 A | 11/1991 | Bourgeois et al. | |
| 5,106,642 A | 4/1992 | Ciofalo | |
| 5,301,602 A | 4/1994 | Ryczek | |
| 5,442,999 A | 8/1995 | Meister | |
| 5,531,154 A | 7/1996 | Perez, III | |
| 5,758,569 A | 6/1998 | Barbour | |
| 5,813,321 A | 9/1998 | Bourgeois | |
| 5,896,810 A | 4/1999 | Barbour | |
| 5,918,535 A * | 7/1999 | Moreau .................. | 99/413 |
| 5,970,852 A | 10/1999 | Bourgeois | |
| 5,992,306 A * | 11/1999 | Chiang .................. | 99/411 |
| 6,058,830 A | 5/2000 | Bourgeois | |

FOREIGN PATENT DOCUMENTS

| | | |
|---|---|---|
| AT | 2685862 | 7/1993 |
| DE | 217592 | 10/1961 |
| GB | 2205734 | 12/1988 |

* cited by examiner

*Primary Examiner*—Timothy F. Simone
(74) *Attorney, Agent, or Firm*—Garvey, Smith, Nehrbass & North, L.L.C.; Charles C. Garvey, Jr.

(57) ABSTRACT

An improved outdoor cooking apparatus features a pot with multiple cooking inserts and burner frame that supports a burner element. One insert can be used for cooking an entire poultry carcass. Other inserts are perforated baskets that can be used to fry items.

87 Claims, 7 Drawing Sheets

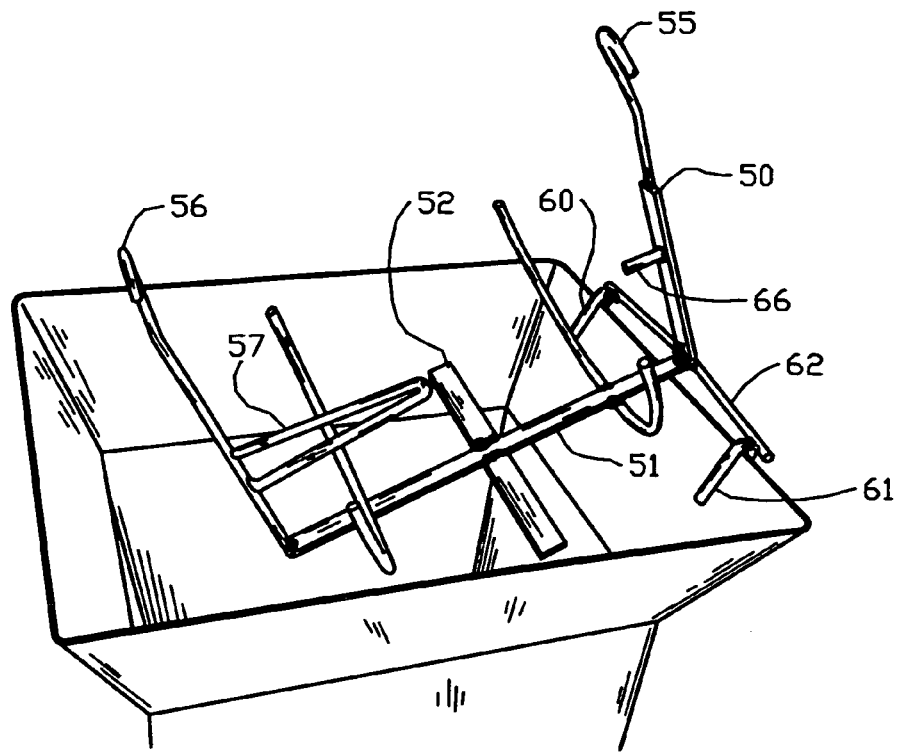
FIGURE 5
FIGURE 6
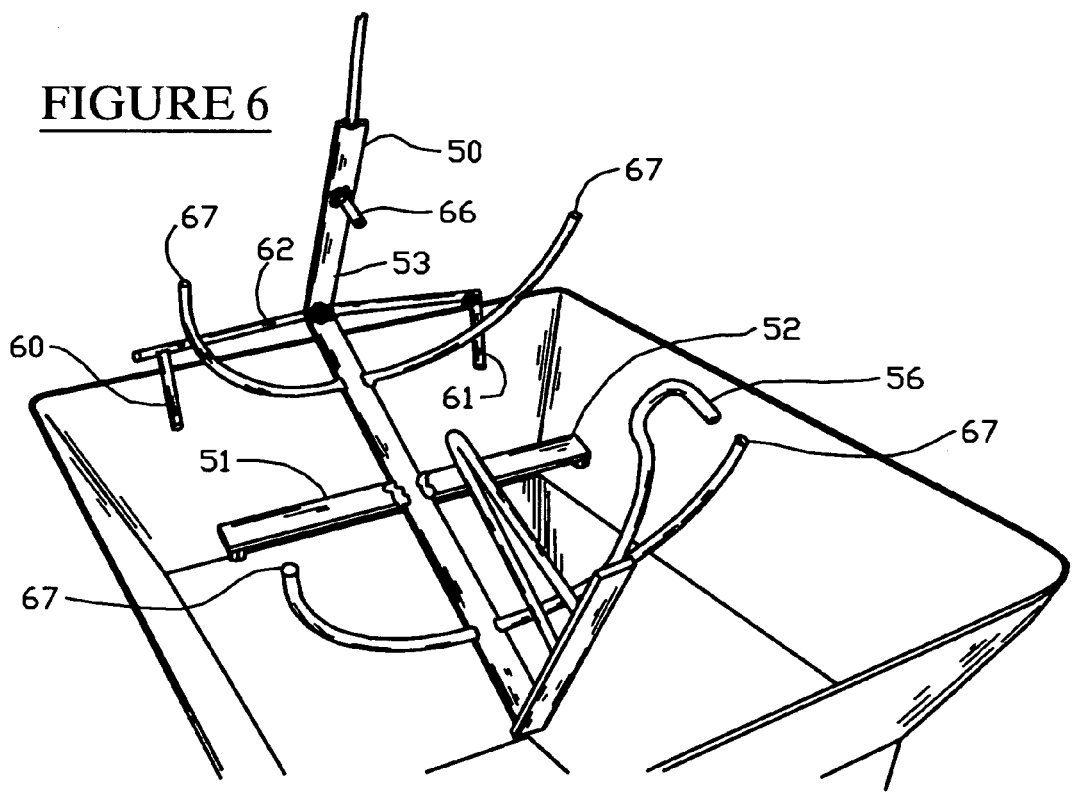

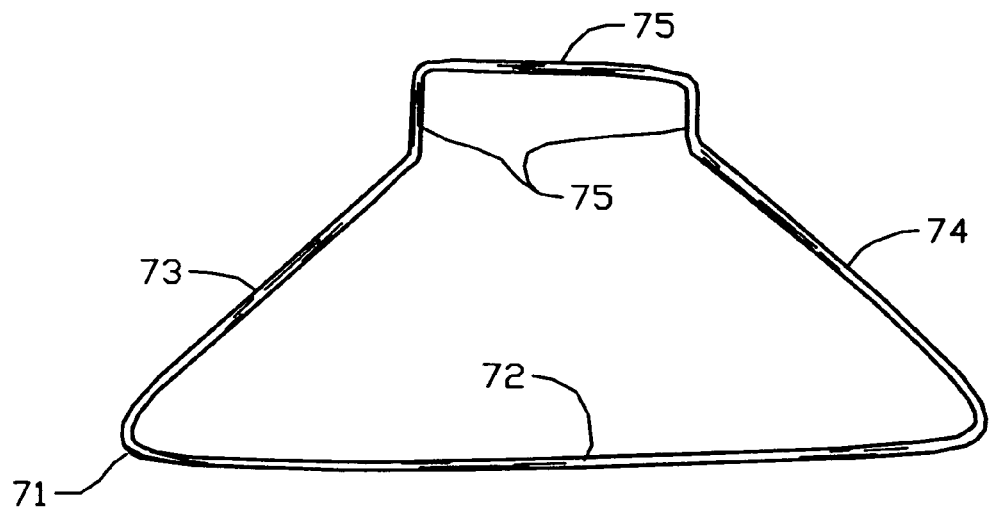
FIGURE 8
FIGURE 9
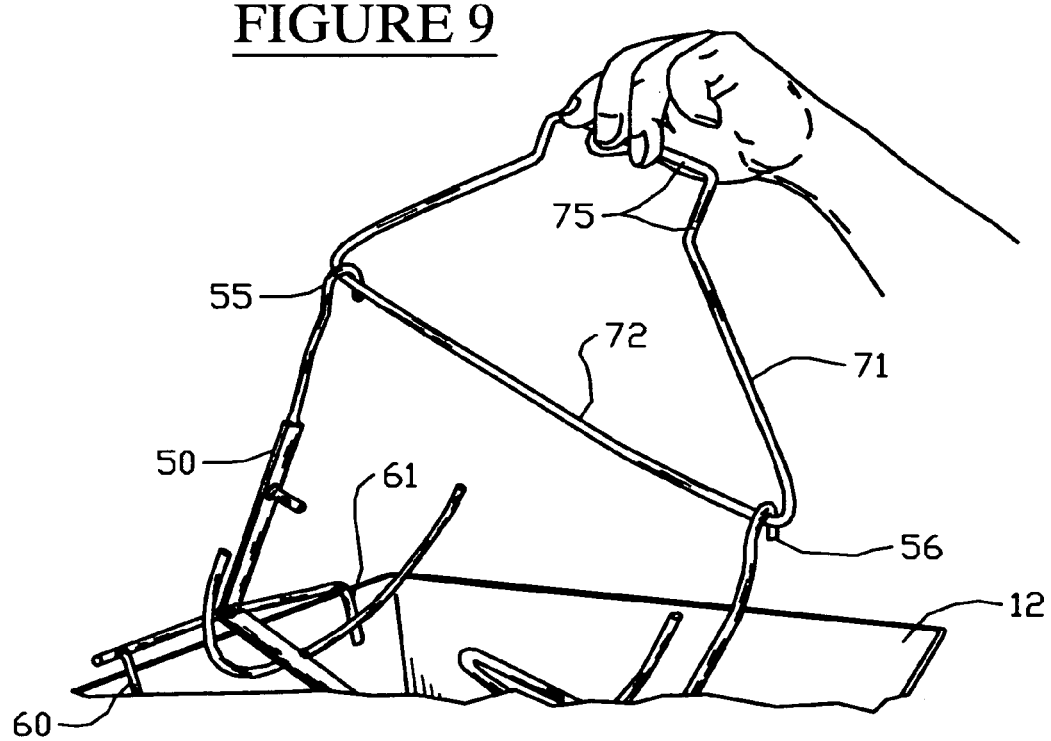

OUTDOOR COOKING APPARATUS

CROSS-REFERENCE TO RELATED APPLICATIONS

Priority of U.S. Provisional Patent Application Ser. No. 60/479,198, filed Jun. 17, 2003, incorporated herein by reference, is hereby claimed.

STATEMENT REGARDING FEDERALLY SPONSORED RESEARCH OR DEVELOPMENT

Not applicable

REFERENCE TO A "MICROFICHE APPENDIX"

Not applicable

BACKGROUND OF THE INVENTION

1. Field of the Invention

The present invention relates to outdoor cooking devices that are fueled with gaseous fuel (e.g. propane, butane) and more particularly to an improved outdoor cooking device that can be used in a number of different cooking situations including boiling, steaming, and with water or oil as a cooking medium. Even more particularly, the present invention relates to an improved cooking apparatus that has a specially shaped pot and multiple food holding inserts that can optionally be placed inside the pot. The inserts include one or more perforated pans for frying food items such as fish, poultry, or vegetables and wherein a specially configured insert can hold one or more entire poultry carcasses.

2. General Background of the Invention

A number of outdoor cookers have been sold commercially for a number of years and are admitted as "prior art" type burners. These "prior art" burners have traditionally included a metallic frame that supports a burner nozzle, such as a cast iron burner nozzle. Such burner nozzles are commercially available and are used to fire most natural gas fired hot water heaters.

Examples of these prior art type outdoor cooking devices can be seen in the Jan. 1, 1996 brochure of Metal Fusion, Inc., of Jefferson, La. Patents have issued naming Norman Bourgeois as inventor that relate to burners and related cooking apparatus. Examples include U.S. Pat. No. 5,065,735 for a "Convertible Burner Apparatus" that features different primary burner frames and legs that can elevate the burner frames. Other Bourgeois patents that relate to cooking devices include the aforementioned U.S. Pat. Nos. 5,813,321; 5,970,852; and 6,058,830, each said Bourgeois patent hereby incorporated herein by reference.

The burner nozzle can be a cast iron hot water heater type burner nozzle or a jet burner arrangement that uses a single outlet centered in a cylindrically-shaped, vertically oriented metallic tube. The most common version of the prior art "jet burner" arrangement is seen in Metal Fusion's catalog as Model No. 90PK. Another version of this type of cooker includes two spaced apart circular rings connected with struts and having a cylindrically-shaped wind guard or shroud. This type of prior art burner can be seen for example as Metal Fusion Model Nos. 82PK, 83PK, 85PK, 86PK, and 86PKJ.

For cooking some food items such as poultry items, it is sometimes desirable to fry the object in a basket that can be lifted from the pot. An example of this type of "prior art" arrangement is seen in the 1996 Metal Fusion catalog as Model No. 32TPK. For a combination cooking arrangement that includes a burner, pot and liner, the user typically places the poultry item in the basket and lowers it into boiling oil using a bail. In the prior art, bails have often been detachable from the basket so that the user can lower the basket into the pot and the contained boiling oil and then remove the handle or bail therefrom. This allows the user to eliminate the transfer of heat from the basket to the handle during the elongated cooking process.

A number of patents have issued that relate to cooking devices and utensils for use in combination with cooking vessels. The Walker U.S. Pat. No. 4,735,135 provides a utensil assembly and kit including same for cooking vessels used in preparing and supporting combustibles above the bottom of the cooking vessel and away from its inner walls. The utensil kit comprises a base supported above the bottom of the cooking vessel, a plurality of support attachments separately detachable and interchangeably mountable on the base for supporting selected combustible products, and releasable latch mechanism having two parts, one part disposed on the base, and the other part is disposed on each of the support attachments for engaging the base. One of the utensils is a poultry support attachment that fits inside the cavity of a chicken or other poultry enabling it to be positioned upright.

The Rappaport U.S. Pat. No. 3,053,169, discloses a poultry supporting device that sits upon a base in the form of a pan.

A rotisserie cooking arrangement is disclosed in the French Patent 2685862.

A roasting support for fowl is disclosed in U.S. Pat. No. 5,106,642. The apparatus includes a longitudinally extending rod that extends through the center of the turkey having an eyelet at its upper end.

A roaster for poultry and meat is disclosed in U.S. Pat. No. 5,301,602. The apparatus includes a vertical roasting apparatus wherein a predetermined amount of liquid for generating the moisture required to produce a high quality and flavorful roasting of the meat is included in a reservoir formed within the support structure itself and disposed internally of the poultry or meat being roasted.

A vertical spit for displaying roasting or warming is disclosed in U.S. Pat. No. 5,442,999.

A combination outdoor cooker and smoker is disclosed in U.S. Pat. No. 5,531,154. The apparatus includes a cooker having a gas burner coupled to an external gas source through a control valve by a gas supply conduit.

An Austrian patent 217592 discloses a cooking device that has a central member upon which a turkey or chicken is supported during the cooking operation.

British patent 2205734A discloses a device for use in preparing and cooking kebabs that includes walls which are interconnected to define a tube member and into which a first end wall is slidably received to further reinforce the shape formed by the sidewalls and whose end position is determined by the engagement of lips projecting inwardly from the sidewalls. The sidewalls are apertured longitudinally for receiving a knife to cut food within the tube member.

Issued patents to Barbour (U.S. Pat. Nos. 5,758,569 and 5,896,810) disclose a cooking apparatus directed to the frying of poultry items such as turkeys.

Several patents have issued that are directed to a cooker or pot having a spigot provided on the pot wall that enables liquid to be withdrawn from the pot via the spigot. An example of such an early patent is the Saroni U.S. Pat. No. 57,577 entitled "Apparatus for Steaming Vegetables." In the Saroni 577 patent, a spigot B is provided for withdrawing liquid from the receptacle or pot.

The Paterson U.S. Pat. No. 74,123 discloses in FIG. 1 a spigot mounted on the wall of a pot.

The Durham U.S. Pat. No. 123,876 discloses a boiler (see FIGS. 1 and 3) in the form of a pot having handles and a lid H. The Durham '876 patent states that one or more of the lower components are using for cooking solids, and the others are either for soup or other liquid, the latter C or either of them being provided with a tap D at the bottom for drawing off the contents.

The Goodwyn U.S. Pat. No. 159,755 provides a cooking vessel. A faucet B is provided at the lower end of the boiler A.

The Harper U.S. Pat. No. 1,054,114 discloses a furnace that includes a vat that can be fastened to the top of the fire box by means of a sleeve D formed integral therewith and adapted to fit over the smoke pipe E. This vat is provided with a cover D' and also an outlet pipe E having a spigot E'.

A cooking vessel is disclosed in the Clayton U.S. Pat. No. 1,272,222 that includes a cooking vessel 10 having an outlet nipple 11 in which is rotatably mounted on a valve plug 12. This valve structure enables the liquid to be easily drawn off.

The Jobe U.S. Pat. No. 1,390,908 discloses a cooking vessel that has an outer pipe 20 that has one end communicating with the inner receptacle for drawing liquids therefrom, the pipe extending through the outer receptacle and equipped with a valve 21.

The Austin U.S. Pat. No. 1,827,131 provides a pot drain in the form of pipe 12 that is fitted with a cap 13.

The Baker U.S. Pat. No. 2,350,335 discloses a brewer or cooker that has a drain valve 7 adjacent its lower end through which brewed coffee may be withdrawn.

The Shipman U.S. Pat. No. 3,838,680 discloses a combination heating and serving assembly having a drainage outlet or spigot 32 by which the liquid contents of the container may be drawn off from time to time.

BRIEF SUMMARY OF THE INVENTION

The present invention provides an improved outdoor cooking apparatus that includes a burner frame having upper and lower end portions, wherein the lower end portion is configured to engage an underlying support surface, the upper end portion providing a pot support.

A burner element is mounted on the frame for providing a flame to be used during cooking. A pot rests upon the pot support during cooking, the pot having a generally square or rectangular bottom panel, a plurality of side walls, an open top, a pot rim, and an interior for holding a cooking fluid.

One or more inserts or racks are provided that are sized and shaped to fit the pot interior. Each insert or rack optionally rests upon the pot bottom panel in a cooking position and can be attached to the pot rim in a draining position. One of the racks is a poultry cooking insert that can hold an entire poultry carcass (for example turkey, chicken, or a plurality of poultry carcasses).

Another rack that can be placed in a cooking medium within the pot interior is a perforated basket for frying items such as fish, poultry, vegetables or the like. In the preferred embodiment, two frying baskets can be placed inside the pot in a side-by-side position or configuration.

The apparatus of the present invention can be used to steam items when a steamer plate is placed above and supported by the poultry cooking insert.

The present invention can be used with more than one cooking medium, such as with oil or with water. Water is preferably used when steaming, or when cooking certain seafood items that are boiled such as shrimp or crabs. An oil cooking medium is used when frying certain items such as poultry, fish, or vegetables.

BRIEF DESCRIPTION OF THE DRAWINGS

FIG. 5 is a partial perspective view of the preferred embodiment of the apparatus of the present invention illustrating the pot and poultry cooking insert in a draining position;

FIG. 6 is another perspective view of the preferred embodiment of the apparatus of the present invention illustrating the pot and poultry cooking insert in draining position;

FIG. 8 is a partial perspective view of the preferred embodiment of the apparatus of the present invention illustrating the lifting device;

FIG. 9 is a partial plan view of the preferred embodiment of the apparatus of the present invention illustrating the lifting device, pot, and poultry cooking insert;

DETAILED DESCRIPTION OF THE INVENTION

Figure 1:
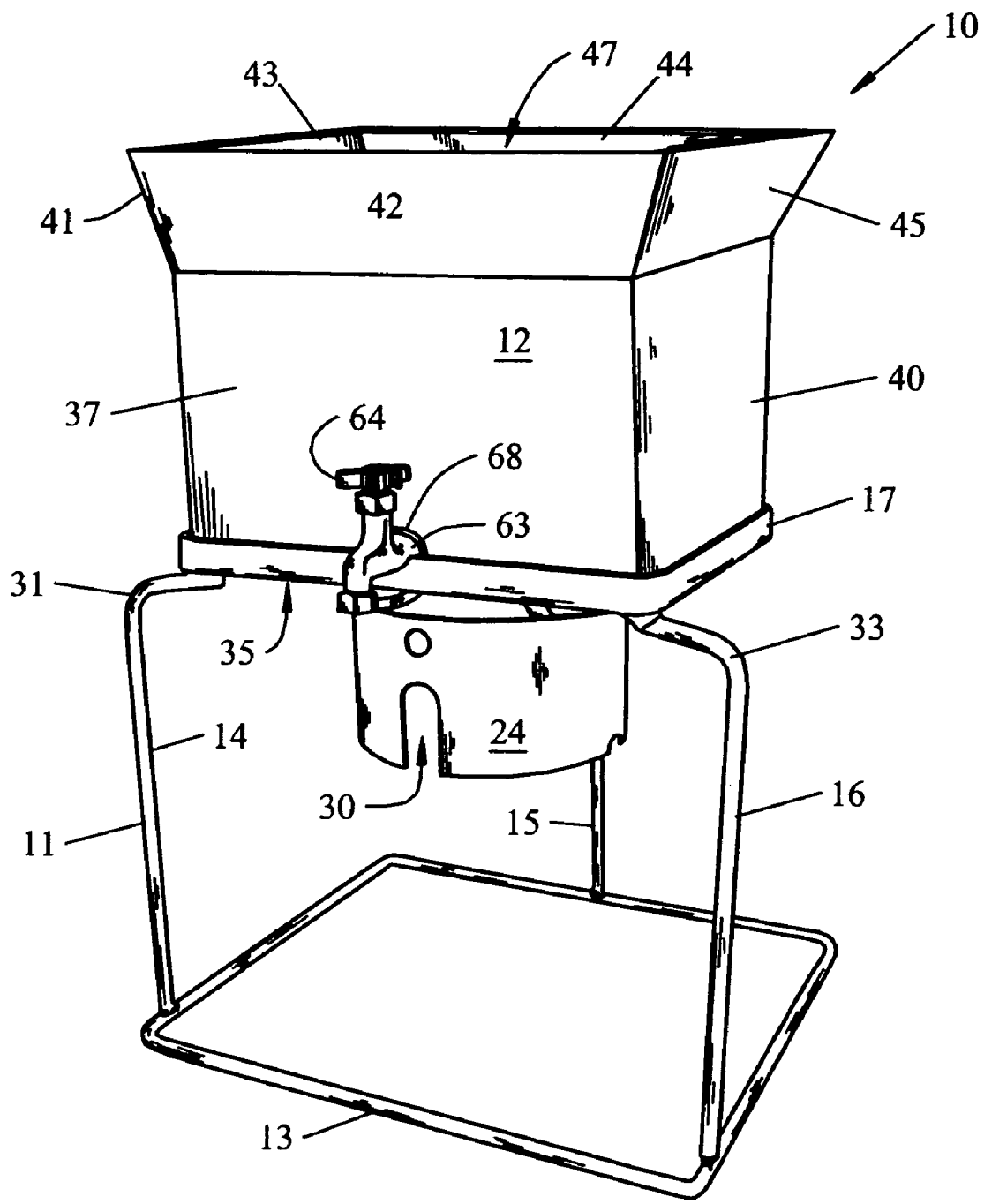
FIG. 1 is a partial perspective view of the preferred embodiment of the apparatus of the present invention.
Figure 2:
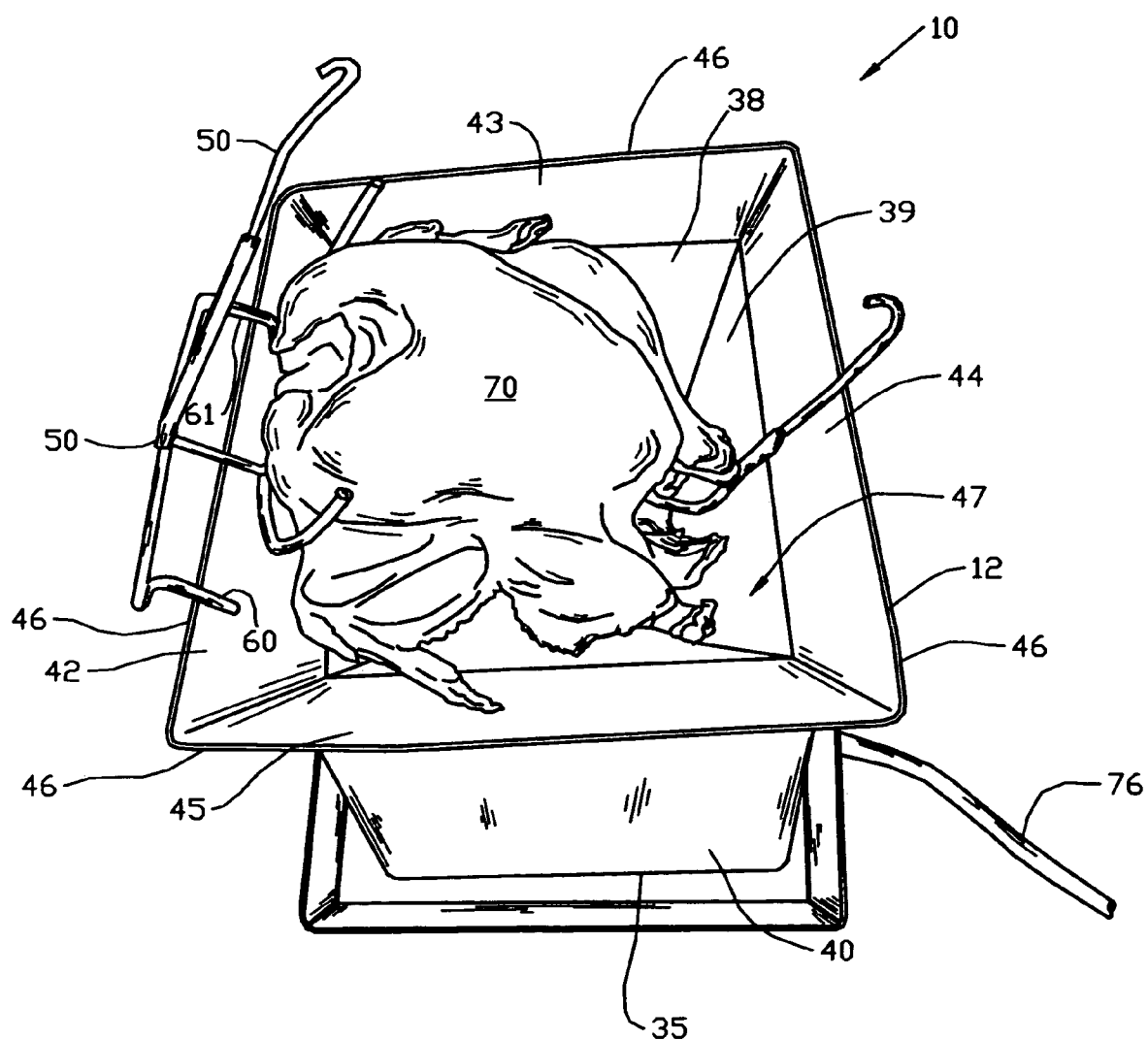
FIG. 2 is another perspective view of the preferred embodiment of the apparatus of the present invention showing a turkey carcass supported upon the poultry cooking insert and in the draining position.
Figure 3:
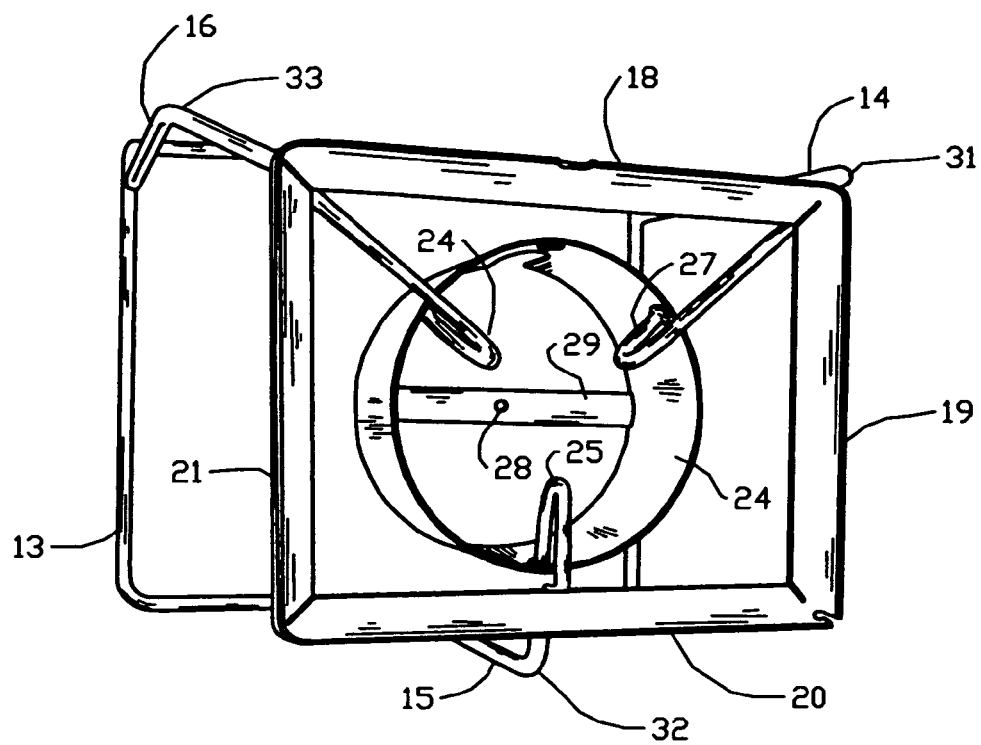
FIG. 3 is a perspective view of the preferred embodiment of the apparatus of the present invention illustrating the burner portion.
Figure 4:
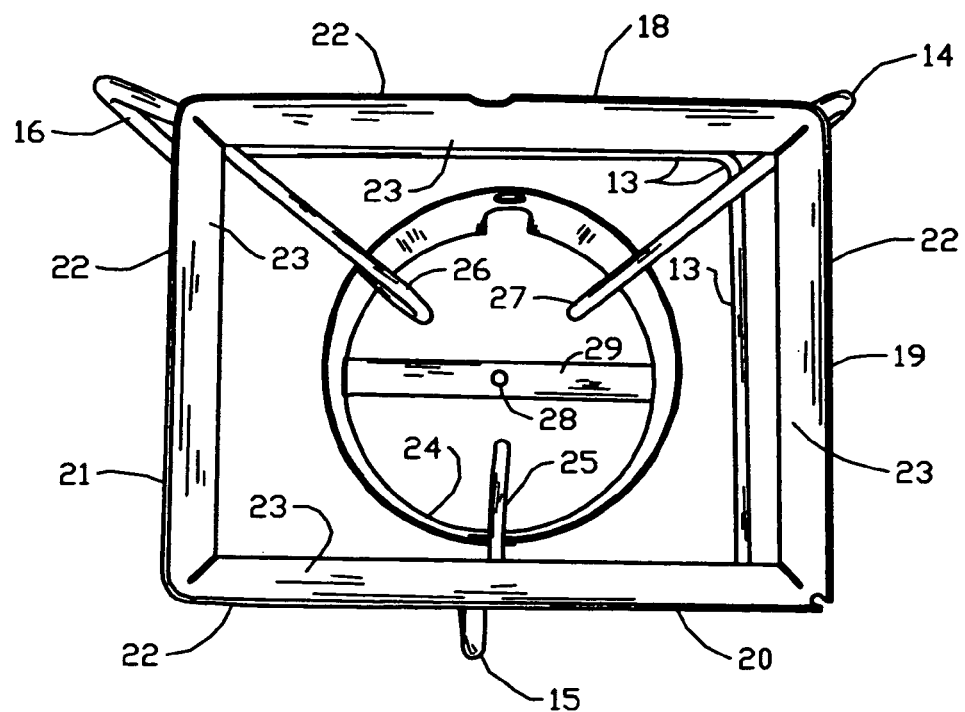
FIG. 4 is a partial perspective view of the preferred embodiment of the apparatus of the present invention illustrating the burner portion.
Figure 7:
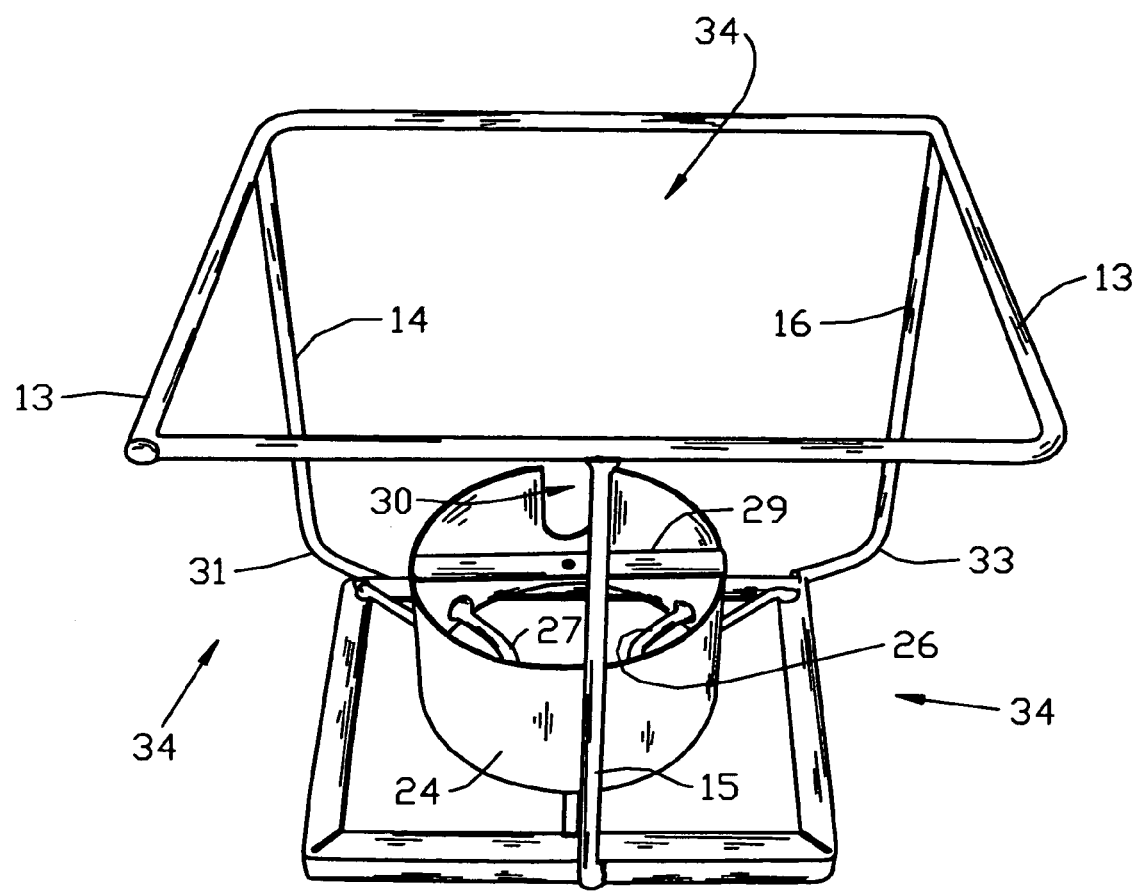
FIG. 7 is a partial bottom perspective view of the preferred embodiment of the apparatus of the present invention showing the burner portion.

FIGS. 1-6 show the preferred embodiment of the apparatus of the present invention, designated generally the numeral 10. Outdoor cooking apparatus 10 includes a burner frame 11 that supports a pot 12. The burner frame provides a generally rectangular base 13 that can be in the form of a square or rectangular member. A plurality of legs 14, 15, 16 extend upwardly along the generally vertical path from base 13 to pot support 17. The pot support 17 can be comprised of a plurality of ell-shaped beams 18, 19, 20, 21. Each beam 18-21 includes a vertical barrier portion 22 and a horizontal support surface 23. The pot 12 provides a bottom panel 35 that rests upon horizontal support surface 23. Vertical barrier 22 portion of each beam 18-21 restrains the pot 12 by engaging sidewall panels 37, 38, 39, 40 and preventing lateral movement of the pot 12 during cooking.

Frame 11 provides a shroud 24 that surrounds the burner element to provide a wind guard, and a plurality of, for example, three shroud supports 25, 26, 27. A burner element support 29 holds a commercially available burner element at burner position 28. A slot 30 in shroud 24 enables a part of the burner element (not shown) to exit the shroud 24 and attach to a supply of fuel such as a propane or butane tank, regulator, and supply hose.

It should be understood that such a gaseous fuel supply is well known in the art and typically includes a propane or butane tank, regulator and hose with appropriate fittings for interfacing between the hose and the burner element. Such burner elements are well known in the art, commercially available and can be seen in one or more of the above incorporated by reference Bourgeois patents.

Each leg 14, 15, 16 has a bend 31, 32, and 33 respectively. This combination of the placement, spacing, and length of legs 14, 15, 16, the size and shape of base 13, and the bends 31, 32, 33 enable the pot 12 to be stored inside the area 34 defined by base 13 and legs 14, 15, 16 and under pot support 17. The overall height of pot 12 is thus less than the height of each leg. Once stored, shroud 24 is positioned inside pot 12 interior 47.

Pot 12 includes a bottom panel 35, a plurality of sidewall panels 37, 38, 39, 40 that define a lower section 36. Pot upper section 41 includes a plurality of preferably four inclined wall panels 42, 43, 44, 45.

Pot rim 46 can provide a continuous upper edge that is defined by the top of each of the inclined wall panels 42, 43, 44, 45. During cooking, any of a selected plurality of cooking inserts or racks can be attached to the pot rim 46 for draining excess cooking fluid from a food item to be cooked. When the selected insert (such as poultry cooking insert 50) is attached to the pot rim 46, cooking fluids such as water or oil can drain back into pot 12 interior 47. The selected inserts or racks can include the poultry cooking insert 50, or a basket (or baskets). Each basket can have a handle that is shaped to track the shape of pot 12 wall. The uppermost end of handle preferably extends above pot rim 46.

In the preferred embodiment, more than one basket can be provided, such as the two baskets positioned side by side. Two baskets can be sized and shaped to fit side-by-side within the confines of sidewall panels 37, 38, 39, 40. The side-by-side cooking baskets thus occupy about the same area as pot bottom panel 35. It should be understood that either one of or both of the baskets can be removed and attached to pot rim 46 using a basket hanger after cooking. This enables a user to cook items in one basket while draining items that have already been cooked and that are contained in the other basket.

Poultry cooking insert 50 as shown in FIGS. 2, 5-6 and 9-11. Poultry cooking insert 50 includes a longitudinal beam 51 and a transverse beam 52. The beams 51, 52 can be welded together. At opposing end portions of longitudinal beam 51 there are provided vertical beams 53, 54 respectively, each having a lifting hook or eyelet 55 or 56.

Figure 10:
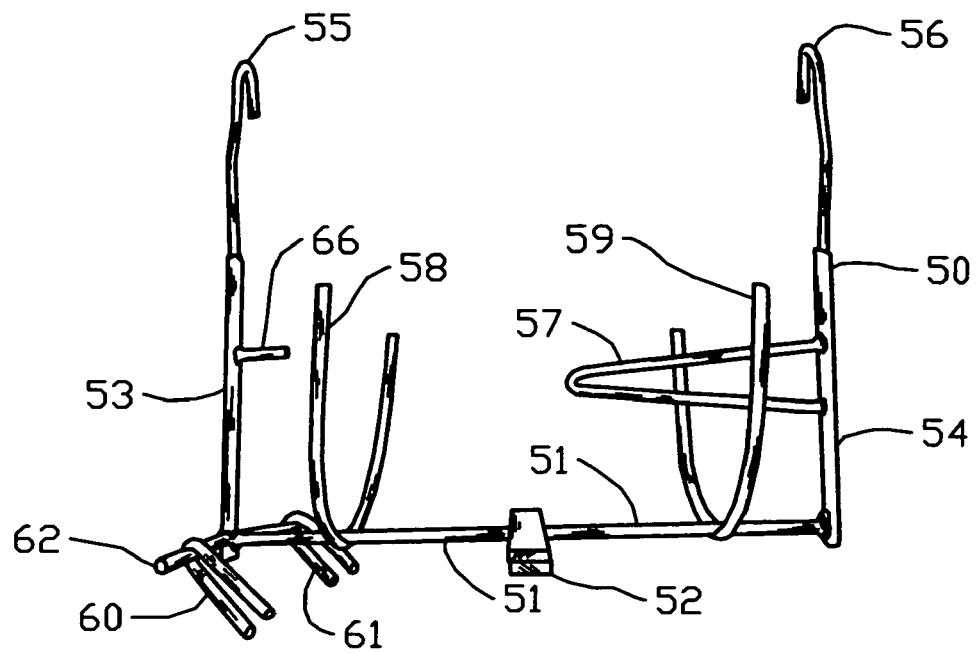
FIG. 10 is a side partial perspective view of the preferred embodiment of the apparatus of the present invention illustrating the poultry cooking insert.
Figure 11:
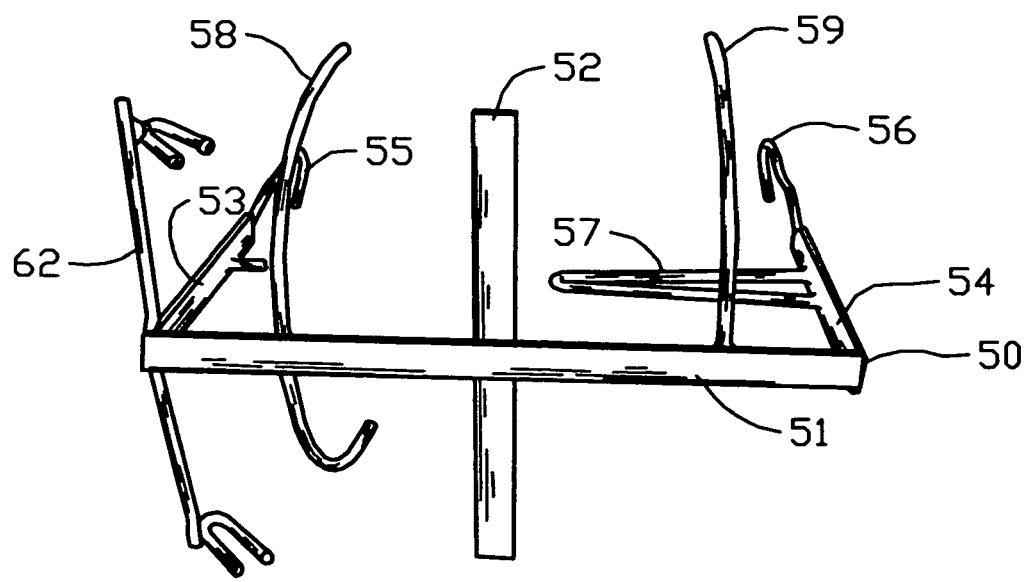
FIG. 11 is a partial perspective view of the preferred embodiment of the apparatus of the present invention illustrating the poultry cooking insert.

Poultry skewer 57 extends laterally from one of the vertical beams 53, 54 and longitudinally, roughly parallel to longitudinal beam 51 (see FIG. 10). One or more curved supports 58, 59 can be attached to longitudinal beam 51 for cradling and supporting of a large poultry item such as the turkey carcass 70 shown in FIG. 2. Hangers 60, 61 can be fork-shaped members that enable the poultry cooking insert 50 to be attached to rim 46 in the draining position shown in FIGS. 2, 5, and 6.

When cooking with any fluid, oil or water, spigot 63 can be used to drain pot interior 47. Spigot 63 can be a commercially available spigot having a valve handle 64 that can be opened and closed so that when opened, the contents of pot 12 drain for disposal or recycling. Spigot 63 can be attached to pot 11 using any suitable outlet fitting or connection 68 such as a welded or bolted fitting or connection. Several prior art patents disclose the concept of draining fluid from a cooking pot using a spigot (e.g. see U.S. Pat Nos. 57,77, 74,123, 123,876, 1,390,908 and 1,827,131).

A draining position is indicated by the numeral 67. In FIGS. 8-9, lifting implement 71 is shown. Implement 71 can be grasped at handle 75 (FIG. 21) and attached at bar 72 to hooks 55, 56, enabling a user to engage and lift insert 50. Diagonal sections 73, 74 connect bar 72 to handle 75.

PARTS LIST

The following is a list of suitable parts and materials for the various elements of the preferred embodiment of the present invention.

| Parts Number | Description |
| --- | --- |
| 10 | outdoor cooking apparatus |
| 11 | burner frame |
| 12 | pot |
| 13 | base |
| 14 | leg |
| 15 | leg |
| 16 | leg |
| 17 | pot support |
| 18 | ell shaped beam |
| 19 | ell shaped beam |
| 20 | ell shaped beam |
| 21 | ell shaped beam |
| 22 | vertical barrier |
| 23 | horizontal support surface |
| 24 | shroud |
| 25 | shroud support |
| 26 | shroud support |
| 27 | shroud support |
| 28 | burner element position |
| 29 | burner element support |
| 30 | slot |
| 31 | bend |
| 32 | bend |
| 33 | bend |
| 34 | area |
| 35 | bottom panel |
| 36 | lower section |
| 37 | side wall panel |
| 38 | side wall panel |
| 39 | side wall panel |
| 40 | side wall panel |
| 41 | upper section |
| 42 | inclined wall panel |
| 43 | inclined wall panel |
| 44 | inclined wall panel |
| 45 | inclined wall panel |
| 46 | pot rim |
| 47 | pot interior |
| 48 | |
| 49 | |
| 50 | poultry cooking insert |
| 51 | longitudinal beam |
| 52 | transverse beam |
| 53 | vertical beam |
| 54 | vertical beam |
| 55 | lifting hook |
| 56 | lifting hook |
| 57 | poultry skewer |
| 58 | curved support |
| 59 | curved support |
| 60 | hanger |
| 61 | hanger |
| 62 | |
| 63 | spigot |
| 64 | valve handle |
| 65 | handle |
| 66 | |

-continued

PARTS LIST

| Parts Number | Description |
| --- | --- |
| 67 | draining position |
| 68 | outlet fitting |
| 69 | hanger |
| 70 | poultry carcass |
| 71 | lifting implement |
| 72 | bar |
| 73 | diagonal section |
| 74 | diagonal section |
| 75 | handle |

The foregoing embodiments are presented by way of example only; the scope of the present invention is to be limited only by the following claims.

The invention claimed is:

1. An outdoor cooking apparatus comprising:
  a) a burner frame having upper and lower end portions, the lower end portion being configured to engage an underlying support surface, the upper end portion providing a pot support;
  b) a burner element mounted on the frame;
  c) a pot that rests upon the pot support during cooking, the pot having a generally rectangular bottom panel, a plurality of lower side walls, a plurality of upper inclined side walls, an open top that has a much larger area than the area of the bottom panel, an interior for holding a cooking fluid, and a pot rim;
  d) a food holding rack that is sized and shaped to fit the bottom panel and pot interior, with the rack resting upon the pot bottom panel in a cooking position;
  e) the rack having a hanger that enables the rack to be supported upon a pot upper inclined wall wherein the hanger engages the pot rim and inclined wall in a draining position; and
  f) the draining position spacing at least part of the rack laterally away from the pot bottom panel.

2. The outdoor cooking apparatus of claim 1 wherein the rack has a central longitudinal axis tilting to define an acute angle with the pot bottom panel.

3. The outdoor cooking apparatus of claim 2 wherein at least a plurality of the pot side walls have an upper inclined pot side wall section and a lower, generally vertical pot side wall section.

4. The outdoor cooking apparatus of claim 2 wherein the lower pot side walls forms an obtuse angle with an upper inclined side wall.

5. The outdoor cooking apparatus of claim 1 wherein the rack has first and second rack end portions and a rack lifting member at each rack end portion.

6. The outdoor cooking apparatus of claim 5 wherein the rack has a skewer for supporting a skewered poultry item in a reclined, non-vertical position.

7. The outdoor cooking apparatus of claim 6 wherein the skewer extends generally horizontally from the rack.

8. The cooking apparatus of claim 1 further comprising a steamer plate that removably attaches to the rack.

9. The cooking apparatus of claim 8 wherein the steamer plate is supported above the pot bottom panel and above a part of the rack.

10. The cooking apparatus of claim 8 wherein the steamer plate has about the same dimensions as the pot bottom panel.

11. The cooking apparatus of claim 1 wherein the rack inclines longitudinal and transverse portions.

12. The cooking apparatus of claim 1 wherein the burner frame pot support includes a retainer that laterally restrains the pot.

13. The cooking apparatus of claim 1 wherein the burner frame has a plurality of legs.

14. The cooking apparatus of claim 1 wherein the pot stores within the burner frame.

15. The cooking apparatus of claim 1 wherein the burner frame includes rectangular base and plurality of legs that span between the base and the pot support.

16. The cooking apparatus of claim 1 wherein the pot stores in a stored position within the frame, wherein the legs extend along the side walls of the pot.

17. The cooking apparatus of claim 1 wherein the burner frame includes a shroud that generally surrounds the burner element.

18. The cooking apparatus of claim 15 wherein the burner frame includes a shroud that generally surrounds the burner element.

19. The cooking apparatus of claim 16 wherein the burner frame includes a shroud that generally surrounds the burner element.

20. An outdoor cooking apparatus comprising:
  a) a burner frame having upper and lower end portions, the lower end portion being configured to engage an underlying support surface the upper end portion providing a pot support;
  b) a burner element mounted on the frame;
  c) a pot that rests upon the pot support during cooking, the pot having a bottom wall having a bottom area, a pot side portion that includes an upper pot walled section and a lower pot walled section, an open top having an open top area that is much greater than the bottom area, an interior for holding a cooking fluid, and a pot rim;
  d) a rack that is sized and shaped to fit the pot interior and pot bottom;
  e) a joint that connects the lower walled section to the upper walled section, the joint being spaced vertically in between the pot rim and pot bottom;
  f) the upper walled section spacing the pot rim vertically above the joint and radially away from the joint;
  g) wherein the upper walled section includes an expansive walled area that extends well above the joint and well below the pot rim; and
  h) the rack being movable to a draining position that engages the pot rim and supports the rack with the upper wall section above the joint.

21. The outdoor cooking apparatus of claim 20 wherein the rack has a central longitudinal axis tilting to define an acute angle with the pot bottom panel.

22. The outdoor cooking apparatus of claim 21 wherein the upper walled section includes inclined pot side walls and a lower, generally vertical pot side walls section.

23. The outdoor cooking apparatus of claim 21 wherein walled sections form an obtuse angle.

24. The outdoor cooking apparatus of claim 20 wherein the rack has first and second rack end portions and a rack lifting member at each rack end portion.

25. The outdoor cooking apparatus of claim 24 wherein the rack has a skewer for supporting a skewered poultry item in a reclined, non-vertical position.

26. The cooking apparatus of claim 25 wherein the skewer extends generally horizontally from the rack.

27. The cooking apparatus of claim 20 further comprising a steamer plate that removably attaches to the rack.

28. The cooking apparatus of claim 27 wherein the steamer plate is supported above the pot bottom panel and above a part of the rack.

29. The cooking apparatus of claim 27 wherein the steamer plate has about the same dimensions as the pot bottom panel.

30. The cooking apparatus of claim 20 wherein the rack inclines longitudinal and transverse portions.

31. The cooking apparatus of claim 20 wherein the burner frame pot support includes a retainer that laterally restrains the pot.

32. The cooking apparatus of claim 20 wherein the burner frame has a plurality of legs.

33. The cooking apparatus of claim 20 wherein the pot stores within the burner frame in a storage position.

34. The cooking apparatus of claim 20 wherein the burner frame includes rectangular base and a plurality of legs that span between the base and the pot support.

35. The cooking apparatus of claim 20 wherein the pot stores in a stored position within the frame, wherein the legs extend along the side walls of the pot.

36. The cooking apparatus of claim 20 wherein the burner frame includes a shroud that generally surrounds the burner element.

37. The cooking apparatus of claim 34 wherein the burner frame includes a shroud that generally surrounds the burner element.

38. The cooking apparatus of claim 35 wherein the burner frame includes a shroud that generally surrounds the burner element.

39. An outdoor cooking apparatus comprising:
   a) a burner frame having upper and lower end portions, the lower end portion being configured to engage an underlying support surface the upper end portion providing a pot support;
   b) a burner element mounted on the frame;
   c) a pot that rests upon the pot support during cooking, the pot having a bottom panel, a side wall section that extends up from the bottom panel and that includes upper and lower sections connected by a joint, an open top that has an open top area that is a much larger area than the area of the bottom panel, an interior for holding a cooking fluid, and a pot rim spaced above the joint and extending radially outwardly from the joint, wherein the pot interior has a transverse cross section that increases in area with increasing distance from the joint;
   d) a rack that is sized and shaped to fit the pot interior, with the rack resting upon the pot bottom panel in a cooking position; and
   e) the rack having a hanger that connects the rack to the sidewall upper section and the pot rim above the joint in a draining position.

40. The outdoor cooking apparatus of claim 39 wherein the rack has a central longitudinal axis tilting to define an acute angle with the pot bottom panel.

41. The outdoor cooking apparatus of claim 40 wherein at least a plurality of the pot side walls have an upper inclined pot side wall section and a lower, generally vertical pot side wall section.

42. The outdoor cooking apparatus of claim 40 wherein each of the pot side walls has an upper inclined pot side wall section and a lower, generally vertical pot side wall section.

43. The outdoor cooking apparatus of claim 39 wherein the rack has first and second rack end portions and a rack lifting member at each rack end portion.

44. The outdoor cooking apparatus of claim 43 wherein the rack has a skewer for supporting a skewered poultry item in a reclined, non-vertical position.

45. The cooking apparatus of claim 44 wherein the skewer extends generally horizontally from the rack.

46. The cooking apparatus of claim 39 further comprising a steamer plate that removably attaches to the rack.

47. The cooking apparatus of claim 46 wherein the steamer plate is supported above the pot bottom panel and above a part of the rack.

48. The cooking apparatus of claim 46 wherein the steamer plate has about the same dimensions as the pot bottom panel.

49. The cooking apparatus of claim 39 wherein the rack inclines longitudinal and transverse portions.

50. The cooking apparatus of claim 39 wherein the burner frame pot support includes a retainer that laterally restrains the pot.

51. The cooking apparatus of claim 39 wherein the burner frame has a plurality of legs.

52. The cooking apparatus of claim 39 wherein the pot stores within the burner frame.

53. The cooking apparatus of claim 39 wherein the burner frame includes rectangular base and a plurality of legs that span between the base and the pot support.

54. The cooking apparatus of claim 39 wherein the pot stores in a stored position within the frame, wherein the legs extend along the side walls of the pot.

55. The cooking apparatus of claim 39 wherein the burner frame includes a shroud that generally surrounds the burner element.

56. The cooking apparatus of claim 53 wherein the burner frame includes a shroud that generally surrounds the burner element.

57. The cooking apparatus of claim 54 wherein the burner frame includes a shroud that generally surrounds the burner element.

58. The cooking apparatus of claim 1 further comprising a spigot on a pot side wall for draining fluid from the pot.

59. The cooking apparatus of claim 20 further comprising a spigot on a pot side wall for draining fluid from the pot.

60. The cooking apparatus of claim 39 further comprising a spigot on a pot side wall for draining fluid from the pot.

61. An outdoor cooking apparatus comprising:
   a) a burner frame having upper and lower end portions, the lower end portion being configured to engage an underlying support surface the upper end portion including a pot support;
   b) a burner element mounted on the frame;
   c) a pot that rests upon the pot support during cooking, the pot having a bottom panel, a side, an open top, an interior for holding a cooking fluid, and a pot rim, wherein the pot has an upper flared section and a lower section, the flared section being connected to the lower section at a joint;
   d) a rack that is sized and shaped to fit the pot interior; and
   e) wherein the rack is attached to the flared section and assumes different angular orientations in the respective cooking and draining positions.

62. An outdoor cooking apparatus for cooking a turkey and other diverse food items comprising:
   a) a burner frame having a base for engaging an underlying support surface, an upper end portion providing a grate for supporting a pot and a burner element for generating a flame;
   b) a pot that is supported during use by the burner frame the pot having a pot bottom that rests upon the grate, a pot side that includes one or more pot side walls, a pot interior, the pot side having a lower section forming a first angle with vertical and an upper section forming a second, greater angle with vertical;

c) the upper section communicating with a pot rim;

d) a food holding insert frame that removably fits the pot interior, the insert having multiple food supporting portions that enable different food items to be selectively supported in different positions, including a first food supporting portion that enables a turkey carcass to be supported in a generally horizontal position and a second food supporting portion that supports a food item that is not a turkey carcass; and e) wherein one of the food holding inserts attaches to the upper section and rim in a draining position.

63. The cooking apparatus of claim 62 further comprising a steamer plate that is supported by the food holding insert.

64. The cooking apparatus of claim 63 wherein the steamer plate removably attaches to the food holding insert.

65. The cooking apparatus of claim 63 wherein the second food supporting portion includes one or more projecting portions.

66. The cooking apparatus of claim of claim 65 wherein the second food supporting portion in generally vertically inclined.

67. The cooking apparatus of claim 62 wherein one of the food supporting portions removably attaches to the food holding insert frame.

68. The cooking apparatus of claim 67 wherein one or more of the food supporting portions are projecting portions.

69. The cooking apparatus of claim 67 wherein one or more of the food supporting portions are projecting spikes.

70. The cooking apparatus of claim 67 wherein one or more of the food supporting portions are projecting skewers.

71. An outdoor cooking apparatus for cooking a turkey and other diverse food items comprising:

a) a burner frame having a base for engaging an underlying support surface, an upper end portion providing a grate for supporting a pot and a burner element for generating a flame;

b) a pot that is supported during use by the burner frame the pot having a pot bottom panel that rests upon the grate in a cooking position, a walled portion that connects to and extends upwardly from the pot bottom panel, the walled portion including a lower walled section, and an upper walled section, a joint that connects the upper and lower walled sections, a pot rim surrounding an open top, the open top having an area that is much greater than the area of the pot bottom panel;

c) a food holding insert frame that includes abeam, a plurality of cradle portions that extend upwardly from the beam and a recess in between the cradle portions that is sized and shaped to hold a turkey carcass, wherein the cradle portions restrain substantial lateral movement of the turkey carcass during use; and d) wherein the food holding insert has one or more hangers that enable it to be attached to an upper wall section above the joint to define a draining position.

72. The cooking apparatus of claim 71 further comprising a steamer plate that is supported by the food holding insert.

73. The cooking apparatus of claim 71 wherein the steamer plate removably attaches to the food holding insert.

74. The cooking apparatus of claim 71 wherein the second food supporting portion includes one or more projecting portions.

75. The cooking apparatus of claim of claim 71 wherein the second food supporting portion in generally vertically inclined.

76. The cooking apparatus of claim 71 wherein one of the food supporting portions removably attaches to the food holding insert frame.

77. The cooking apparatus of claim 71 wherein one or more of the food supporting portions are projecting portions.

78. The cooking apparatus of claim 71 wherein one or more of the food supporting portions are projecting spikes.

79. The cooking apparatus of claim 71 wherein one or more of the food supporting portions are projecting skewers.

80. An outdoor cooking apparatus comprising:

a) a burner frame having upper and lower end portions, the lower end portion being configured to engage an underlying support surface, the upper end portion providing a pot support;

b) a burner element mounted on the frame;

c) a pot that rests upon the pot support during cooking, the pot having a bottom wall having a bottom area, a pot side portion that includes an upper pot walled section and a lower pot walled section, an open top having an open top area that is much greater than the bottom area, an interior for holding a cooking fluid, and a pot rim;

d) a rack that is sized and shaped to fit the pot interior and pot bottom;

e) a joint that connects the lower walled section to the upper walled section, the joint being spaced vertically in between the pot rim and pot bottom;

f) the upper walled section spacing the pot rim vertically above the joint and radially away from the joint; and g) wherein the upper walled section includes an expansive walled area that extends well above the joint and well below the pot rim.

81. The outdoor cooking apparatus of claim 80 wherein the rack has first and second rack end portions and a rack lifting member at each rack end portion.

82. The outdoor cooking apparatus of claim 80 wherein the rack has a skewer for supporting a skewered poultry item in a reclined, non-vertical position.

83. The cooking apparatus of claim 80 wherein the skewer extends generally horizontally from the rack.

84. The cooking apparatus of claim 80 further comprising a steamer plate that removably attaches to the rack.

85. The cooking apparatus of claim 20 wherein the upper pot walled section forms an obtuse angle with the lower pot walled section.

86. The cooking apparatus of claim 80 wherein the pot stores within the burner frame in a storage position.

87. The cooking apparatus of claim 80 wherein the upper walled section extends vertically.

* * * * *